US010272996B2

(12) United States Patent
Kinlan et al.

(10) Patent No.: US 10,272,996 B2
(45) Date of Patent: Apr. 30, 2019

(54) ABRASION RESISTANT PIVOT BEARING

(71) Applicant: Sikorsky Aircraft Corporation, Stratford, CT (US)

(72) Inventors: Jeffrey Kinlan, Shelton, CT (US); Adam Philip Fox, Hamden, CT (US); David N. Schmaling, Southbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 68 days.

(21) Appl. No.: 15/548,381

(22) PCT Filed: Feb. 3, 2016

(86) PCT No.: PCT/US2016/016350
§ 371 (c)(1),
(2) Date: Aug. 2, 2017

(87) PCT Pub. No.: WO2016/126809
PCT Pub. Date: Aug. 11, 2016

(65) Prior Publication Data
US 2018/0016002 A1    Jan. 18, 2018

Related U.S. Application Data

(60) Provisional application No. 62/112,418, filed on Feb. 5, 2015.

(51) Int. Cl.
B64C 27/35    (2006.01)
B64C 27/82    (2006.01)

(52) U.S. Cl.
CPC .............. *B64C 27/35* (2013.01); *B64C 27/82* (2013.01)

(58) Field of Classification Search
CPC ................................ B64C 27/35; B64C 27/82
See application file for complete search history.

(56) References Cited

U.S. PATENT DOCUMENTS

| 3,782,854 A | 1/1974 | Cybicki |
| 3,932,059 A | 1/1976 | Rybicki |
| 4,142,833 A | 3/1979 | Rybicki et al. |
| 5,188,513 A | 2/1993 | Byrnes |

(Continued)

OTHER PUBLICATIONS

Notification of Transmital of the International Search Report for International Application No. PCT/US2016/016350 dated Apr. 17, 2016; dated May 5, 2016; 9 pages.

(Continued)

*Primary Examiner* — Thomas Moulis
(74) *Attorney, Agent, or Firm* — Cantor Colburn LLP

(57) ABSTRACT

An elastomeric bearing configured for use in a rotor blade assembly is provided including an inner race, and an outer race. An outer damper portion is arranged adjacent the outer race and an inner snubber portion is arranged adjacent the inner race. A rigid transition layer is disposed between the outer damper portion and the inner snubber portion. The rigid transition layer has a generally circular cross-section except at a segment which has been removed and which defines a generally planar surface at a chord of the segment. The generally planar surface is configured to contact a surface of an adjacent component.

14 Claims, 6 Drawing Sheets

(56) References Cited

U.S. PATENT DOCUMENTS

| | | | | |
|---|---|---|---|---|
| 5,297,874 | A * | 3/1994 | Raines | F16F 1/403 |
| | | | | 248/603 |
| 5,540,549 | A | 7/1996 | McGuire | |
| 5,913,659 | A | 6/1999 | Doolin et al. | |
| 6,045,328 | A | 4/2000 | Jones | |
| 6,827,553 | B2 | 12/2004 | Jones et al. | |
| 7,097,169 | B2 * | 8/2006 | Mueller | B64C 27/35 |
| | | | | 267/140.4 |
| 8,037,573 | B2 | 10/2011 | Bost, Jr. | |
| 2011/0243731 | A1 * | 10/2011 | Meyer | B64C 27/35 |
| | | | | 416/1 |
| 2013/0121828 | A1 * | 5/2013 | Davis | B64C 27/32 |
| | | | | 416/134 A |
| 2014/0252157 | A1 * | 9/2014 | Sottiaux | F16C 33/04 |
| | | | | 244/17.11 |
| 2014/0255191 | A1 * | 9/2014 | Jarrett | F16C 33/04 |
| | | | | 416/134 A |

OTHER PUBLICATIONS

Written Opinion of the International Searching Authority for International Application No. PCT/US2016/016350 dated Apr. 17, 2016; dated May 5, 2016; 6 pages.

* cited by examiner

ABRASION RESISTANT PIVOT BEARING

CROSS REFERENCE TO RELATED APPLICATIONS

This application is a National Stage application of PCT/US2016/016350, filed Feb. 3, 2016, which claims the benefit of U.S. Provisional Application No. 62/112,418, filed Feb. 5, 2015, both of which are incorporated by reference in their entirety herein.

BACKGROUND OF THE INVENTION

Exemplary embodiments of the invention relate to a rotary wing aircraft, and more particularly, to a pivot bearing of an elastomeric bearing system configured for use in a rotary wing aircraft.

Flexbeam main rotor and tail rotor blade systems utilize resilient elastomeric bearings between a flexbeam and a surrounding torque tube. The elastomeric bearings position the torque tube relative to the flexbeam to permit the blade to pitch, flap, lead, and lag.

The elastomeric bearings are typically referred to as snubbers/dampers which include vertically stack arrangements of spherical and flat elastomeric laminates. The spherical bearing "snubber" accommodates pitch change and flapping rotation while the flat layers accommodate lead/lag linear motions and some radial span-wise motion. The snubber/dampers are located between the flexbeam and the torque tube under a preload so that the elastomer laminates thereof remain in compression throughout the full range of articulation. The snubber/dampers are often mounted through an opening in the torque tube for attachment to a retainer plate which is bonded to the flexbeam.

Conventional elastomeric bearing may fail in response to a retainer plate disbond. After a retainer disbond, the elastomeric bearings are pulled outboard and into contact with an adjacent motion limiter due to a combination of centrifugal force and bearing preload along the sloped flexbeam. Line contact is typically formed between the elastomeric bearing and the adjacent motion limiter when the elastomeric bearing is disbonded from the retainer. The outboard displacement is such that contact between the elastomeric bearing and the motion limiter may result in damage to the elastomeric bearing, the flexbeam, and the torque tube. As a result, the elastomeric bearing, motion limiter, and flexbeam is typically inspected every 50 hours of operation.

BRIEF DESCRIPTION OF THE INVENTION

According to one embodiment of the invention, an elastomeric bearing configured for use in a rotor blade assembly is provided including an inner race, and an outer race. An outer damper portion is arranged adjacent the outer race and an inner snubber portion is arranged adjacent the inner race. A rigid transition layer is disposed between the outer damper portion and the inner snubber portion. The rigid transition layer has a generally circular cross-section except at a segment which has been removed and which defines a generally planar surface at a chord of the segment. The generally planar surface is configured to contact a surface of an adjacent component.

In addition to one or more of the features described above, or as an alternative, in further embodiments a coating of abrasive resistant material is disposed over the planar surface of the rigid transition layer.

In addition to one or more of the features described above, or as an alternative, in further embodiments the generally planar surface of the rigid transition layer is arranged substantially parallel to the surface of the adjacent component.

In addition to one or more of the features described above, or as an alternative, in further embodiments the planar surface of the rigid transition layer is generally rectangular in shape.

In addition to one or more of the features described above, or as an alternative, in further embodiments an area of contact formed between the generally planar surface of the rigid transition layer and the surface of the adjacent component is rectangular in shape.

In addition to one or more of the features described above, or as an alternative, in further embodiments the adjacent component is a backing plate having a motion limiter extending from the backing plate generally parallel to a bearing axis to define a wall generally transverse to the backing plate.

In addition to one or more of the features described above, or as an alternative, in further embodiments a surface area of the planar surface of the rigid transition layer is equal to or smaller than a surface area of a wall.

According to another embodiment of the invention, a tail rotor blade assembly is provided including a flexbeam, a retainer mounted to the flexbeam, and a torque tube defined at least partially around the flexbeam. An elastomeric bearing is mounted to the retainer and includes an inner and outer race. An outer damper portion is arranged adjacent the outer race and an inner snubber portion is arranged adjacent the inner race. A rigid transition layer is disposed between the outer damper portion and the inner snubber portion. The rigid transition layer has a generally circular cross-section except at a segment which has been removed and which defines a generally planar surface at a chord of the segment. The generally planar surface is configured to contact a surface of an adjacent component when the retainer at least partially detaches from the flexbeam.

In addition to one or more of the features described above, or as an alternative, in further embodiments the generally planar surface at a chord of the segment is configured to contact a surface of an adjacent motion limiter.

In addition to one or more of the features described above, or as an alternative, in further embodiments a coating of abrasive resistant material is disposed over the planar surface of the rigid transition layer.

In addition to one or more of the features described above, or as an alternative, in further embodiments the generally planar surface of the rigid transition layer is arranged substantially parallel to the surface of the motion limiter.

In addition to one or more of the features described above, or as an alternative, in further embodiments the generally planar surface of the rigid transition layer is generally rectangular in shape.

In addition to one or more of the features described above, or as an alternative, in further embodiments an area of contact formed between the generally planar surface of the rigid transition layer and the surface of the motion limiter is rectangular in shape.

In addition to one or more of the features described above, or as an alternative, in further embodiments a surface area of the planar surface of the rigid transition layer is equal to or smaller than a surface area of the motion limiter.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
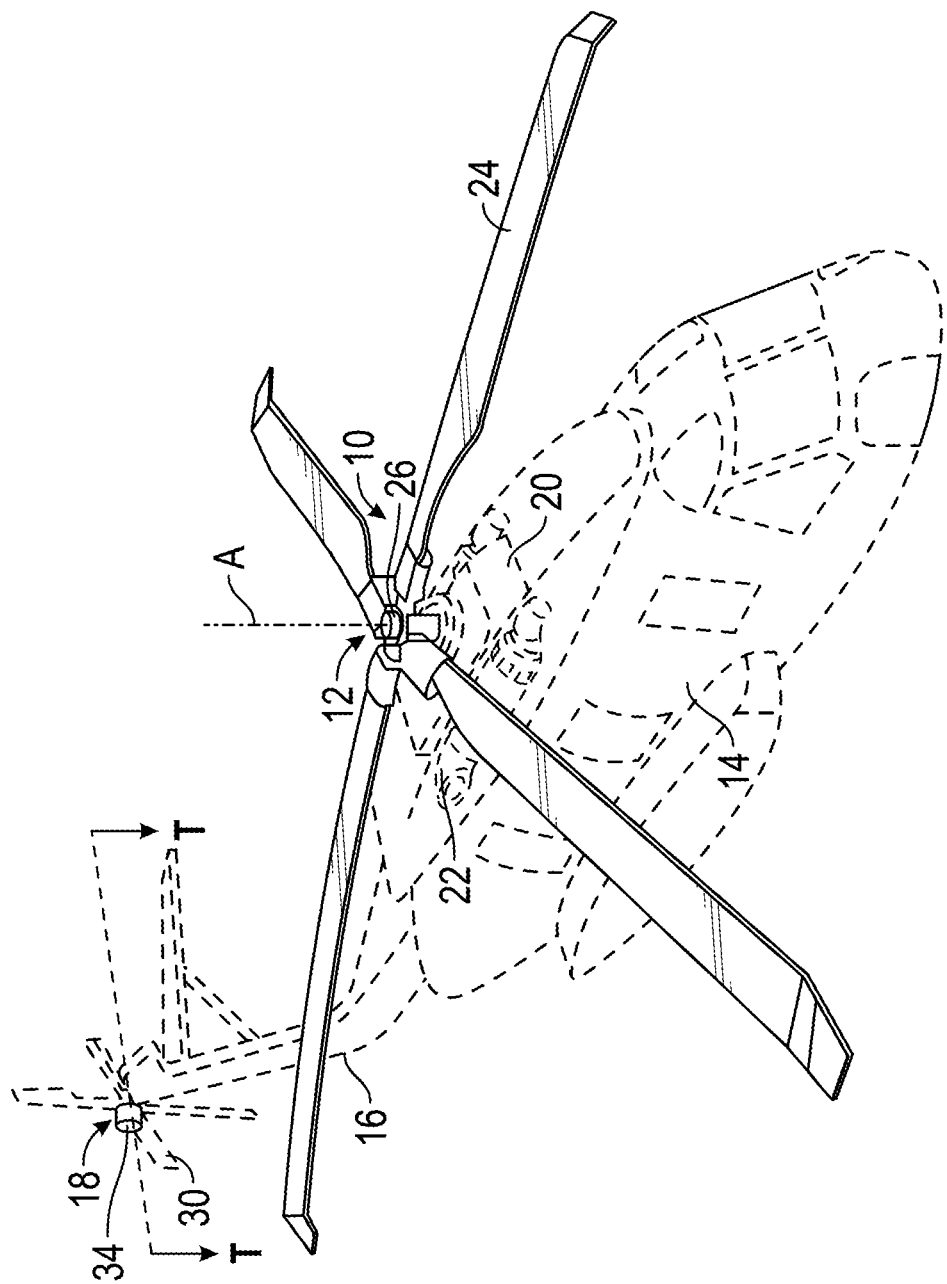
FIG. 1 is a general perspective view of an example of a rotary wing aircraft for use with the present invention.

FIG. 1 schematically illustrates a rotary-wing aircraft 10 having a main rotor system 12. The aircraft 10 includes an airframe 14 having an extending tail 16 which mounts a tail rotor system 18, such as an anti-torque system. The main rotor assembly 12 is driven about an axis of rotation A through a main gearbox (illustrated schematically at 20) by one or more engines 22. The main rotor system 12 includes multiple rotor blade assemblies 24 mounted to a rotor hub 26. The anti-torque system 18 includes multiple tail rotor blade assemblies 30 mounted to a tail rotor hub 34 and configured to rotate about an axis of rotation T. Although a particular helicopter configuration is illustrated and described in the disclosed non-limiting embodiment, other configurations and/or machines, such as high speed compound rotary wing aircraft with supplemental translational thrust systems, dual contra-rotating coaxial rotor system aircraft, turboprops, tilt-rotors, and tilt-wing aircraft, will also benefit from the present invention.

Figure 2A:
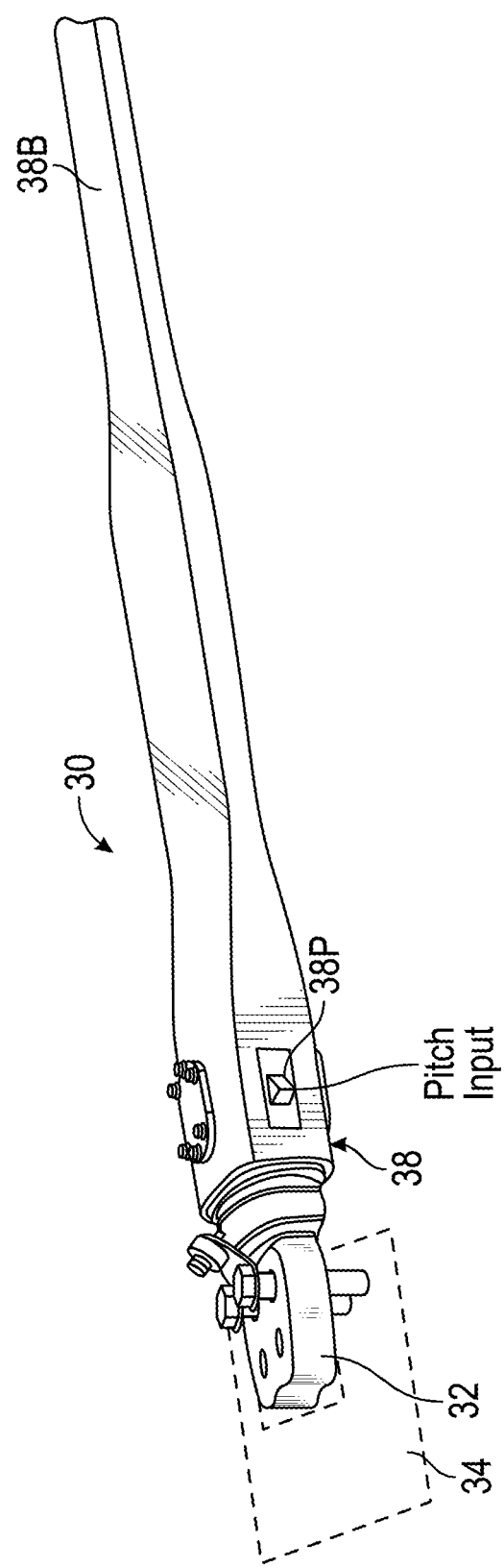
FIG. 2A is a perspective view of a tail rotor blade assembly of a rotary wing aircraft according to an embodiment of the invention.

Referring now to FIG. 2A, a tail rotor blade assembly 30 of the anti-torque system 18 is illustrated in more detail. Each tail rotor blade assembly 30 generally includes a flexbeam 32, which mounted to the tail rotor hub 34. A torque tube 38 at least partially envelopes the flexbeam 32. The torque tube 38 mounts or is integral with a tail rotor blade airfoil 38B to accommodate blade flap and pitch change motion into the blade assembly 30 through deflection of the flexbeam 32.

Pitch change to each blade assembly 30 may be input through a pitch horn 38P mounted to the torque tube 38 to cause the blade assembly 30 to pitch about a feathering axis. It should be understood that although a single tail rotor blade assembly is illustrated and described herein, such description is applicable to a plurality, or all of the blade assemblies of the anti-torque system 18. In addition, although a particular tail rotor system is illustrated in the disclosed embodiments, other main and tail rotor systems, as well as other elastomeric bearing mounts are within the scope of the invention.

Figure 2B:
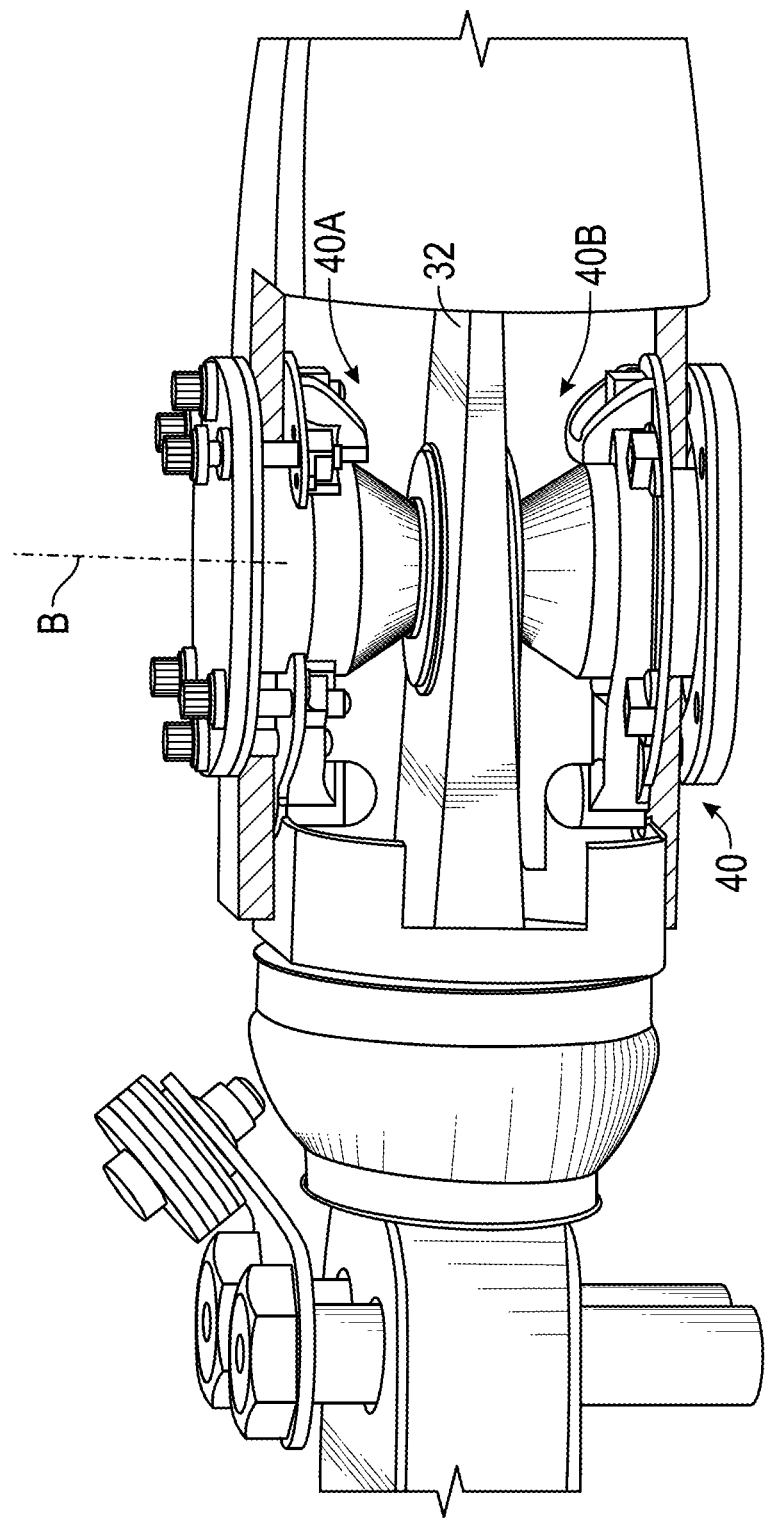
FIG. 2B is an partial phantom view side view of the tail rotor blade assembly of FIG. 2A.

With respect to FIG. 2B, an elastomeric bearing system 40 is mounted to the torque tube 38 and the flexbeam 32 to support the torque tube 38 with respect to the flexbeam 32. The elastomeric bearing system 40 is configured to transfer push rod loads from the pitch horn 38P (see FIG. 2A) through the torque tube 38 and into the flexbeam 32. The elastomeric bearing system 40 includes an upper elastomeric bearing system 40A and a lower elastomeric bearing system 40B defined along a bearing axis B with the flexbeam 32 located there between. Although the description herein is directed to the upper elastomeric bearing system 40A, the description may also apply to the lower elastomeric bearing system 40B.

Figure 2C:
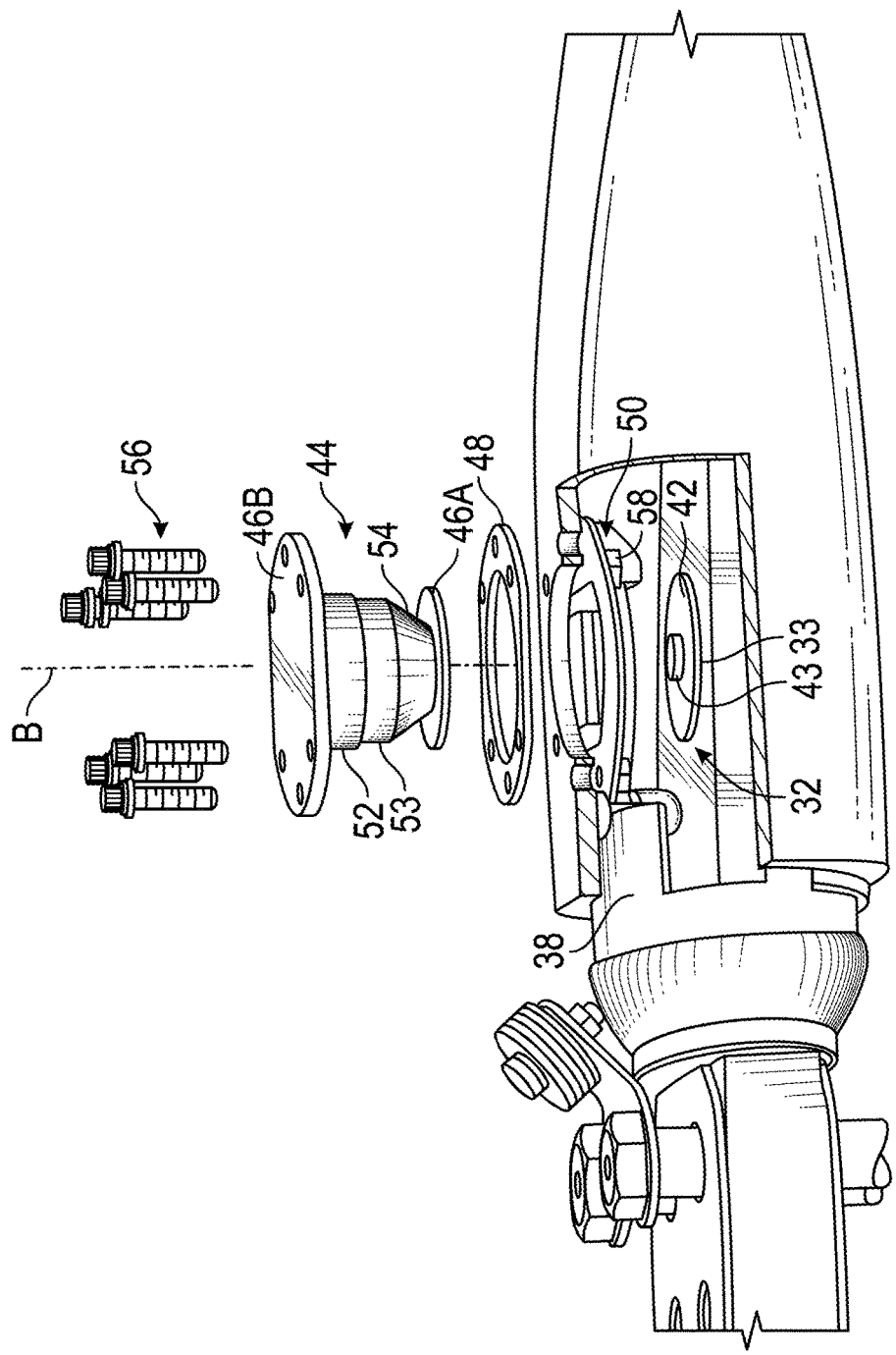
FIG. 2C is an exploded view of the tail rotor blade assembly of FIG. 2A.

As illustrated in FIG. 2C, the upper elastomeric bearing system 40A generally includes a retainer 42, an elastomeric bearing 44 having an inner race 46A, and an outer race 46B, a spacer 48, and a backing plate 50 defined along the bearing axis B. The inner race 46A is generally spherical in shape and the outer race 46B is of a generally planar plate shape. The elastomeric bearing 44 includes an outer damper portion 52 and an inner snubber portion 54 which may be of the elastomeric bearing type having a stack of alternate layers of elastomer laminates and rigid laminates sandwiched together and bonded to the inner and outer race 46A, 46B.

The outer damper portion 52 is a cylindrically shaped elastomeric bearing with generally flat laminates to accommodate in-plane, lead-lag motions. The inner snubber portion 54 is a generally spherical elastomeric bearing with generally semi-spherical laminates concentric about a point on the blade feathering axis so as to accommodate blade pitch and flap change. A rigid transition layer 53 is arranged between the outer damper portion 52 and the inner snubber portion 54.

Figure 3:
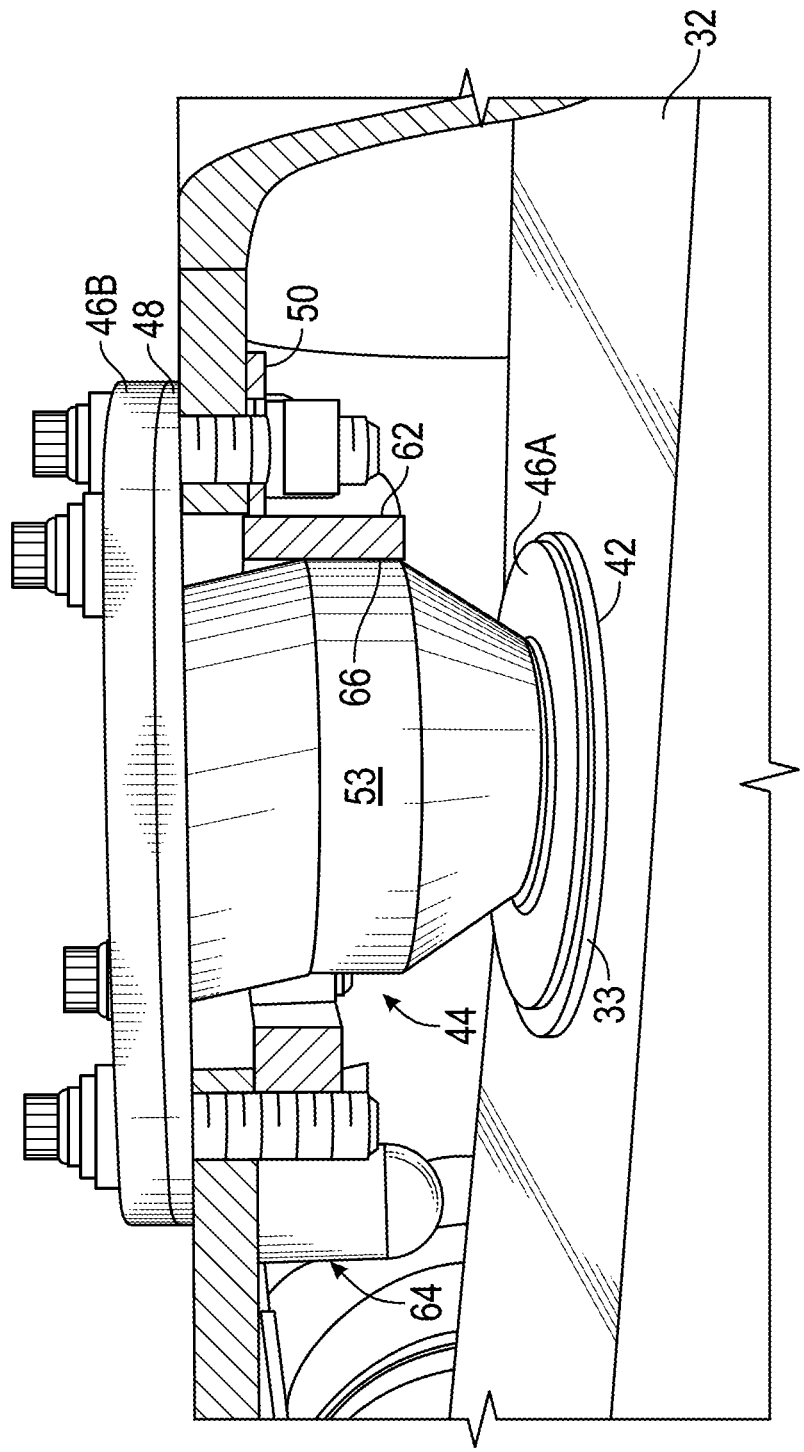
FIG. 3 is another perspective view of a portion of the interior of the tail rotor blade assembly of FIG. 2A.

With reference to FIG. 3, the retainer 42 is mounted to the flexbeam 32 through an adhesive bond 33 of another attachment method which provides an attachment there between. The retainer 42 includes a stud 43 which is engagable with the inner race 46A so as to facilitate a readily field replaceable elastomeric bearing 44.

The spacer 48 is located between the outer race 46B and the torque tube 38. The spacer 48 shims any potential gap between the outer race 46B and the torque tube 38 to accommodate potential manufacturing tolerances so that the elastomeric bearing 44 is properly loaded in compression.

The outer race 46B is mounted to the torque tube 38 by fasteners 56, 58, such as a bolt 56 and nut 58 arrangement for example, so as to readily attach the outer race 46B to the torque tube 38. The bolts 56 are received through the outer race 46B, the spacer 48, and the torque tube 38 to engage the nuts on the backing plate 50 and thereby clamp the elastomeric bearing 44 in a precompressed state.

The backing plate 50 is a generally semi-circular of C-shaped plate having a motion limiter 62 and a redundant pivot 64 which extend from the plate 50 about a partial annulus (not shown). It should be understood that the term "plate" is not to be limited to only a completely flat member, but any member that includes various ribs, features, and other contours, structural and otherwise, yet still able to abut another surface.

The backing plate 50 facilitates flight operations and maintains the structural integrity of the tail rotor system 18. The motion limiter 62 operates to decrease deterioration of the elastomeric bearing 44 should the adhesive bond 33 between the retainer 42 and the flexbeam 32 at least partially fail. The motion limiter 62 extends generally parallel to the bearing axis B to define a wall 66 generally transverse to the plate 50. As shown in FIG. 3, the motion limiter 62 does not contact any other component, particularly the elastomeric bearing 44, during normal flight conditions when the bond 33 is intact.

The backing plate 50 provides a preventative and fail-safe feature which facilitates less frequent inspection intervals, provide redundant flight operations after failure, and avoid secondary damage to the blade structure. The wall 66 of the motion limiter 62 operates as a bumper surface specifically located in an outboard position to allow normal motion of the elastomeric bearing 44 during normal flight operations, yet provide restraint should the retainer 42 begin to disbond and if the elastomeric bearing 44 experiences extreme deflection. If the adhesive bond 33 between the retainer 42 and the flexbeam 32 fails, the motion limiter 62 minimizes the outboard creep of the elastomeric bearing 44 due to centrifugal loading. The wall 66 of the motion limiter 62 is located to provide a contact surface with the rigid transition layer 53.

Figure 4:
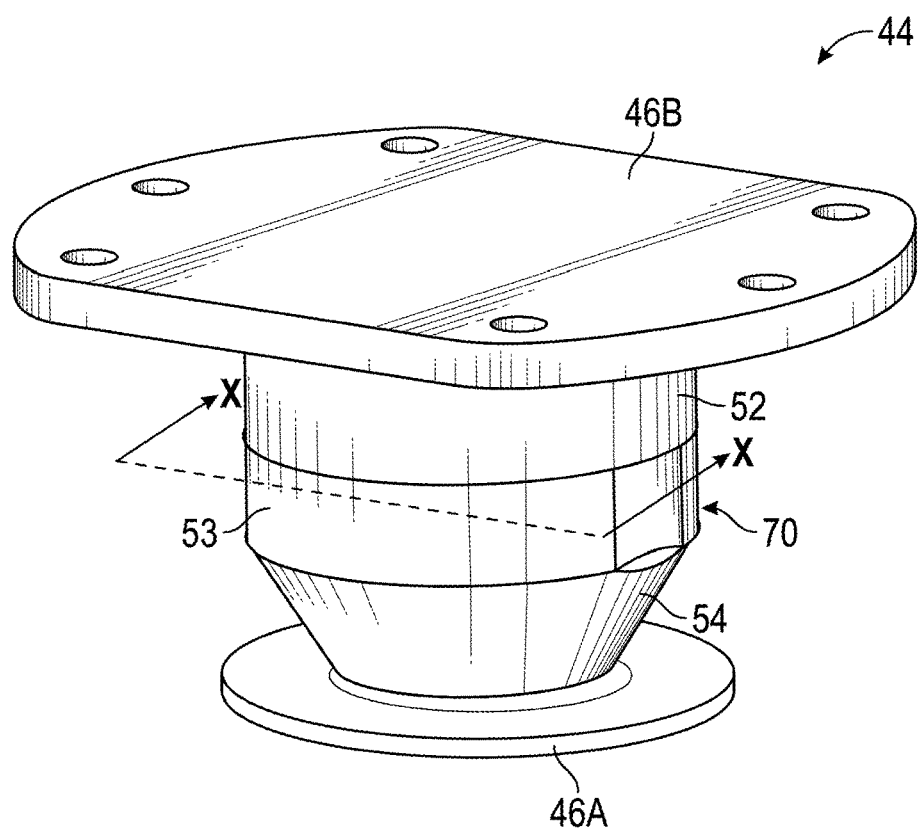
FIG. 4 is a perspective view of an elastomeric bearing according to an embodiment of the invention.
Figure 4A:
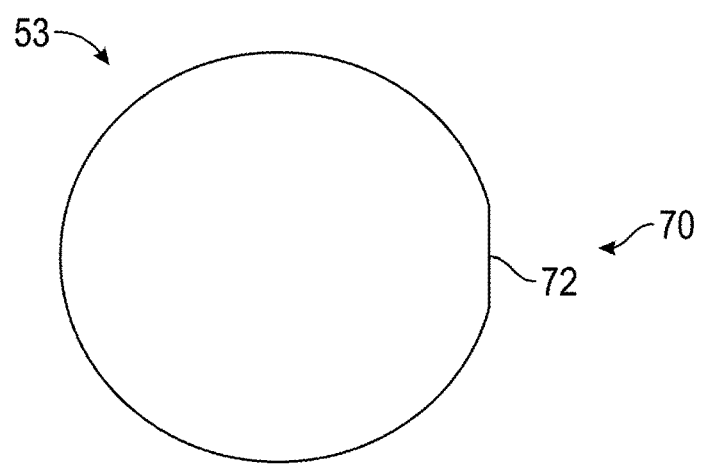
FIG. 4A is a cross-sectional view of the elastomeric bearing of FIG. 3 taken along line X-X according to an embodiment of the invention.

Referring now to FIGS. 4 and 4A, an elastomeric bearing 44 according to an embodiment of the invention is illustrated in more detail. Although the rigid transition layer 53 has a generally circular cross-section (FIG. 4A), the portion 70 of the rigid transition layer 53 configured to contact the wall 66 of the motion limiter 62 has a generally planar surface 72 that extends into and bisects the circle defined by the rigid transition layer 53. Specifically, the surface 72 extends along a chord of the circle, with the segment of the arc of the circle defined by the chord being removed. The planar surface 72 is arranged substantially parallel to wall 66. While described in terms of a circle, it is understood that the cross section could also be substantially circular, such as elliptical in shape.

In one embodiment, the planar surface 72, is generally rectangular, more particularly, square in shape. The surface area of the planar surface 72 may be generally equal to or smaller than a surface area of the wall 66 of the adjacent motion limiter 62. As a result, in the event that the elastomeric bearing 44 disbonds from the retainer 42, the contact formed between the portion 70 of the rigid transition layer 53 and the wall 66 of the motion limiter 62 has an area generally rectangular or square in shape. In one embodiment, the planar surface 72 of the rigid transition layer 53 is coated with an abrasion resistant material to minimize the wear generated at the area of contact formed between the portion 70 of the rigid transition layer 53 and the wall 66 of the motion limiter 62. An example of such an abrasion resistant material is KAron manufactured by Kamatics Corporation.

By forming a planar surface 72 parallel to the wall 66 of the motion limiter 62 into the rigid transition layer 53, the area of contact formed between the elastomeric bearing 44 and the motion limiter 62 when disbanded from the retainer 42 is increased. As a result, the fatigue stress generated at the area of contact is reduced, thereby increasing the length of time that an elastomeric bearing 44 may be disposed in contact with the motion limiter 62 before a failure occurs. This extended life allows the tail rotor blades 30 to be operated for a significantly increased number of hours between inspections.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An elastomeric bearing configured for use in a rotor blade assembly, the bearing comprising:
    an inner race;
    an outer race;
    an outer damper portion arranged adjacent the outer race;
    an inner snubber portion arranged adjacent the inner race; and
    a rigid transition layer disposed between the outer damper portion and the inner snubber portion, the rigid transition layer having a generally circular cross-section except at a segment which has been removed and which defines a generally planar surface at a chord of the segment configured to contact a surface of an adjacent component.

2. The elastomeric bearing according to claim 1, wherein a coating of abrasive resistant material is disposed over the planar surface of the rigid transition layer.

3. The elastomeric bearing according to claim 1, wherein the generally planar surface of the rigid transition layer is arranged substantially parallel to the surface of the adjacent component.

4. The elastomeric bearing according to claim 1, wherein the planar surface of the rigid transition layer is generally rectangular in shape.

5. The elastomeric bearing according to claim 1, wherein an area of contact formed between the generally planar surface of the rigid transition layer and the surface of the adjacent component is rectangular in shape.

6. The elastomeric bearing according to claim 1, wherein the adjacent component is a backing plate having a motion limiter extending from the backing plate generally parallel to a bearing axis to define a wall generally transverse to the backing plate.

7. The elastomeric bearing according to claim 6, wherein a surface area of the planar surface of the rigid transition layer is equal to or smaller than a surface area of the wall.

8. A tail rotor blade assembly, comprising:
    a flexbeam;
    a torque tube defined at least partially around the flex beam;
    a retainer mounted to the flex beam;
    an elastomeric bearing mounted to the retainer, and the elastomeric bearing including: an inner race;
    an outer race;
    an outer damper portion arranged adjacent the outer race;
    an inner snubber portion arranged adjacent the inner race; and
    a rigid transition layer disposed between the outer damper portion and the inner snubber portion, the rigid transition layer having a generally circular cross-section except at a segment which has been removed and which defines a generally planar surface at a chord of the segment, the generally planar surface being configured to contact a surface of an adjacent component when the retainer at least partially detaches from the flexbeam.

9. The tail rotor blade assembly according to claim 8, wherein the generally planar surface at a chord of the segment is configured to contact a surface of an adjacent motion limiter.

10. The tail rotor blade assembly according to claim 8, wherein a coating of abrasive resistant material is disposed over the planar surface of the rigid transition layer.

11. The tail rotor blade assembly according to claim 8, wherein the generally planar surface of the rigid transition layer is arranged substantially parallel to the surface of the motion limiter.

12. The tail rotor blade assembly according to claim 8, wherein the generally planar surface of the rigid transition layer is generally rectangular in shape.

13. The tail rotor blade assembly according to claim 8, wherein an area of contact formed between the generally planar surface of the rigid transition layer and the surface of the motion limiter is rectangular in shape.

14. The elastomeric bearing according to claim 8, wherein a surface area of the planar surface of the rigid transition layer is equal to or smaller than a surface area of the motion limiter.

* * * * *